United States Patent Office 3,240,802
Patented Mar. 15, 1966

3,240,802
PHENYLALKYL-AMINOOXY CARBOXYLIC ACIDS
Jerry E. Robertson, Milwaukee, Wis., assignor to Colgate-Palmolive Company, a corporation of Delaware
No Drawing. Filed Oct. 30, 1962, Ser. No. 234,236
6 Claims. (Cl. 260—519)

This invention relates to aralkyl derivatives and uses therefor. More particularly, this invention is concerned with novel aralkyl-aminooxy acids, processes of producing such compounds and uses for these compounds.

This application is a continuation-in-part of my copending application Serial No. 88,664 filed February 13, 1961, now abandoned.

According to the present invention there are provided novel aralkyl-aminooxy acids of the formulae

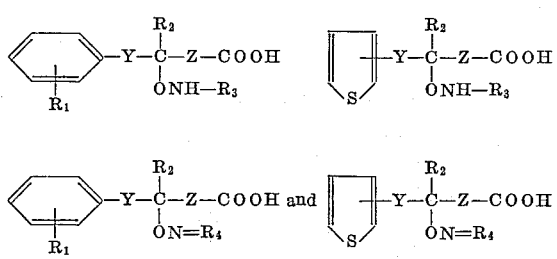

wherein $R_1$ is hydrogen or at least one nuclear substituent of the group consisting of the halogens and particularly bromine and chlorine, hydroxy, lower alkyls and particularly methyl, ethyl, propyl and butyl, lower alkoxys and particularly methoxy, ethoxy and propoxy, lower alkylenedioxy groups such as 3,4-methylenedioxy, nitro, amino and lower alkylthio groups such as thiomethyl and thioethyl, $R_2$ is hydrogen or a lower alkyl such as methyl, ethyl or isopropyl, $R_3$ is hydrogen or acyls of the formula

—C—R₆ wherein $R_6$ is a lower alkyl such as methyl and ethyl, phenyl and phenyl-lower alkyl groups such as benzyl and phenethyl, or in other words, lower alkanoyl, benzoyl and phenyl-lower alkanoyl groups, =$R_4$ represents a lower alkylidene group such as methylidene, ethylidene and isopropylidene or a phenyl-lower alkylidene group such as benzylidene and phenethylidene and Y and Z represent single chemical bonds and straight or branched lower alkylenes, with each advisably having not more than five carbons, such as methylene, ethylene, isopropylene and butylene, and nontoxic acid addition salts thereof. The compounds of greatest interest are those in which $R_1$ represents hydrogen, 3-hydroxy, 4-hydroxy, 3-methoxy, 4-methoxy, 3-trifluoromethyl, 4-trifluoromethyl, 3-chloro, 4-chloro, 2-thiomethyl, 3-thiomethyl and 4-thiomethyl. The compounds having $R_3$ of greatest interest are those in which it is hydrogen, benzoyl or carboethoxy.

Compounds of this invention can be produced by reacting a halo-aralkanoic acid with a beta-acyl hydroxylamine (viz, a substituted hydroxamic acid) to produce an acylaminooxy aralkanoic acid which can be hydrolyzed to form an aminoöxy aralkanoic acid. This process can be represented as follows as applied to the phenyl and thienyl containing compounds:

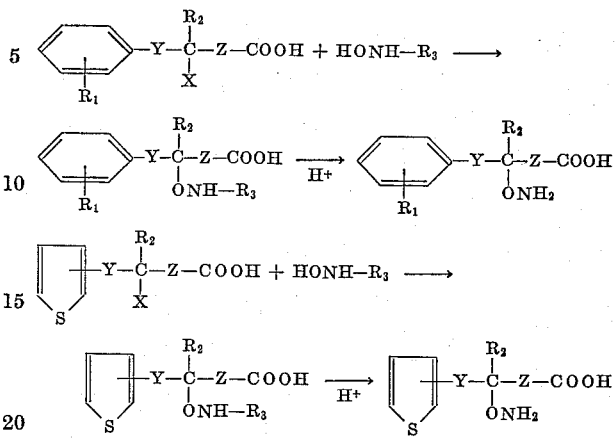

wherein X is a reactive halogen such as bromine and chlorine and $R_1$, $R_2$, $R_3$, Y and Z have the assigned significance but $R_3$ is not hydrogen.

Some of the halo-aralkanoic acids which can be used in the process are alpha-chloro phenylacetic acid,
alpha-chloro-alpha-phenyl propionic acid,
alpha-bromo-beta-phenylpropionic acid,
alpha-bromo-gamma-phenylbutyric acid,
beta-chloro-gamma-phenylbutyric acid,
3-bromo-5-(p-methoxyphenyl)-pentanoic acid,
2-bromo-4-(3,4-methylenedioxyphenyl)-pentanoic acid,
alpha-bromo-beta-(2-thienyl)-propionic acid,
alpha-chloro-alpha-(3-thienyl)-propionic acid,
beta-bromo-gamma-(2-thienyl)-butyric acid,
alpha-bromo-alpha-methyl-beta-(3-thienyl)-propionic
  acid, and similar compounds in which the phenyl ring contains various substitutents such as m-nitro, 2,6-diethoxy, p-acetoxy, 3,4-dimethyl and p-methylthio. Such reactants containing nuclear hydroxy groups are first converted to benzyloxy ethers to avoid the possibility of self-condensation. The benzyl groups can be cleaved subsequently to reform the hydroxy groups using mild catalytic hydrogenation or treatment with HBr.

Some of the beta-acyl hydroxylamines which can be used in the process are benzohydroxamic acid, acethydroxamic acid (also called N-acetyl hydroxylamine), N-formyl hydroxylamine, N-propionylhydroxylamine, N-benzoyl hydroxylamine and N-phenylacetyl hydroxylamine.

The first step of the reaction can be readily effected by bringing the reactants together in a suitable organic liquid reaction medium such as a lower alcohol like ethanol or propanol, advisably in the presence of an inorganic base. The inorganic base converts the hydroxylamine to a salt which reacts more readily with the halogen on the aralkanoic acid. Bases such as the alkali metal hydroxides and carbonates can be used in the reaction. The reaction proceeds at room temperature but elevated temperatures, such as reflux temperature, are used to hasten the reaction rate. After the reaction is terminated the desired product can be isolated by conventional manipulative techniques.

Some of the intermediate compounds which are produced in this way are alpha-benzoylaminooxy-beta-phenylpropionic acid,
beta-benzoylaminooxy-beta-phenylpropionic acid,
alpha-acetylaminooxy-alpha-phenylpropionic acid,
alpha-phenylacetylaminooxy-gamma-phenylbutyric acid,
alpha-methyl-alpha-benzoylaminooxy-beta-
 phenylpropionic acid,
3-acetylaminooxy-3-(3,4-methylenedioxyphenyl)-
 propionic acid,
alpha-benzoylaminooxy-beta-(p-phenoxyphenyl)-
 propionic acid,
beta-propionylaminooxy-gamma-(p-nitrophenyl)-
 propionic acid,
beta-propionylaminooxy-beta-(p-nitrophenyl)-
 propionic acid,
alpha-benzoylaminooxy-alpha-phenylacetic acid,
alpha-carboethoxyaminooxy-beta-phenylpropionic acid,
alpha-carboethoxyaminooxy-beta-(3,4-dihydroxyphenyl)-
 propionic acid,
3-acetylaminooxy-3-(p-methylphenyl)-propionic acid,
alpha-phenylacetylaminooxy-gamma-(2-thiomethyl-
 phenyl)-butyric acid,
alpha-benzoylaminooxy-beta-(p-hydroxyphenyl)-
 propionic acid,
alpha-benzoylaminooxy-beta-(p-chlorophenyl)-
 propionic acid,
3-acetylaminooxy-3-(p-methoxyphenyl)-propionic acid,
alpha-benzoylaminooxy-beta-(2-thienyl)-propionic acid,
alpha-acetylaminooxy-alpha-methyl-beta-(3-thienyl)-
 propionic acid,
alpha-benzoylaminooxy-alpha-phenylacetic acid,
alpha-benzoylaminooxy-alpha-(3-thienyl)-acetic acid and
beta-phenylacetylaminooxy-gamma-(2-thienyl)-butyric
 acid.

The intermediate compounds such as those just described can be hydrolyzed to cleave the acyl groups represented by $R_3$. The hydrolysis is readily effected in an aqueous mineral acid solution at an elevated temperature such as at reflux.

Representative of the aminooxy alkanoic acids that are produced in this way are alpha-aminooxy-beta-phenylpropionic acid,
beta-aminooxy-beta-phenylpropionic acid,
alpha-aminooxy-alpha-phenylpropionic acid,
alpha-aminooxy-gamma-phenylbutyric acid,
alpha-methyl-alpha-aminooxy-beta-phenylpropionic acid,
3-aminooxy-3-(3,4-methylenedioxyphenyl)-propionic
 acid,
alpha-aminooxy-beta-(p-hydroxyphenyl)-propionic acid,
beta-aminooxy-gamma-(p-nitrophenyl)-propionic acid,
alpha-aminooxy-beta-(p-nitrophenyl)-propionic acid,
2-aminooxy-6-phenylhexanoic acid,
alpha-aminooxy-beta-(m-hydroxyphenyl)-propionic acid,
alpha-aminoxy-beta-(p-methoxyphenyl)-propionic acid,
alpha-aminooxy-beta-(m-methoxyphenyl)-propionic acid,
alpha-aminoxy-beta-(3,4-dimethoxyphenyl)-propionic
 acid,
alpha-aminooxy-beta-(m-trifluoromethylphenyl)-
 propionic acid,
alpha-aminooxy-beta-(p-trifluoromethylphenyl)-
 propionic acid,
alpha-aminooxy-beta-(m-chlorophenyl)-propionic acid,
alpha-aminooxy-beta-(p-chlorophenyl)-propionic acid,
alpha-aminooxy-beta-(o-thiomethylphenyl)-propionic
 acid,
alpha-aminooxy-beta-(m-thiomethylphenyl)-propionic
 acid,
alpha-aminooxy-beta-(p-thiomethylphenyl)-propionic
 acid,
alpha-aminooxy-beta-methyl-beta-phenylpropionic acid,
alpha-aminooxy-alpha-methyl-beta-(3,4-dihydroxy-
 phenyl)-propionic acid,
alpha-aminooxy-gamma-(p-phenoxyphenyl)-butyric acid,
alpha-aminooxy-gamma-(p-methylphenyl)-butyric acid,
2-aminooxy-6-(p-aminophenyl)-hexanoic acid,
alpha-aminooxy-beta-(2-thienyl)-propionic acid,
beta-aminooxy-beta-(3-thienyl)-propionic acid,
alpha-aminooxy-gamma-(3-thienyl)-butyric acid and
alpha-methyl-alpha-aminooxy-beta-(2-thienyl)-
 propionic acid.

Compounds of this invention can also be produced by reacting a halo-aralkanoic acid, such as those previously named, with an appropriate oxime to form an intermediate alkylidenyl-aminooxy aralkanoic acid which upon hydrolysis gives the aminooxy aralkanoic acids. This process can be represented as follows as applied to the phenyl and thienyl containing compounds:

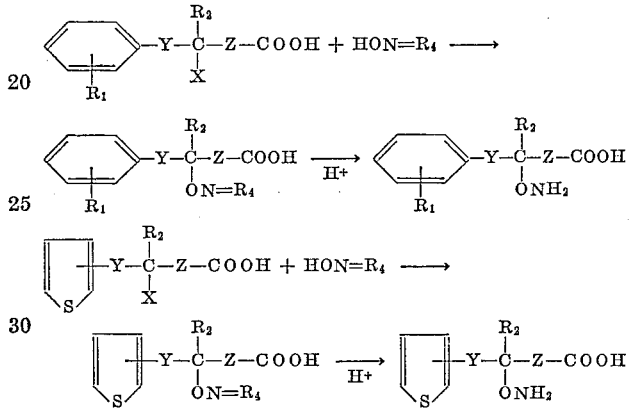

wherein X is a reactive halogen, $R_1$, $R_2$, $R_4$, Y and Z have the assigned significance but $R_4$ is not hydrogen.

Some of the oximes which can be used in the described process are acetaldehyde oxime, propionaldehyde oxime, butyraldehyde oxime, benzaldehyde oxime, phenylacetaldehyde oxime and acetone oxime.

Halo-aralkanoic acids such as those previously named may also be used in this process.

The reaction between the halo-aralkanoic acid and oxime can be readily effected using the reaction conditions described above for the hydroxylamine reaction.

Some of the intermediate alkylidenylaminooxy aralkanoic acids which are produced in this way are alpha-methylidenylaminooxy-beta-phenylpropionic acid,
beta-ethylidenylaminooxy-beta-phenylpropionic acid,
alpha-propylidenylaminooxy-alpha-phenylpropionic acid,
alpha-phenylethylidenylaminooxy-gamma-phenylbutyric
 acid,
alpha-methyl-alpha-benzylidenylaminooxy-beta-phenyl
 propionic acid,
2-ethylidenylaminooxy-3 - (3,4 - methylenedioxyphenyl)-
 propionic acid,
alpha-phenylpropylidenylaminooxy-gamma-(p-nitro-
 phenyl)-propionic acid,
alpha-methylidenylaminooxy-beta-(p-chlorophenyl)-
 propionic acid,
beta-ethylidenylaminooxy-beta-(p-hydroxyphenyl)-
 propionic acid,
alpha-phenylethylidenylamino-gamma-(p-phenoxy-
 phenyl)-butyric acid,
alpha-benzylidenylaminooxy-alpha-(p-methoxyphenyl)-
 acetic acid,
alpha-methylidenylaminooxy-beta-(p-methylphenyl)-propionic acid,
alpha-propylidenylaminooxy-alpha-(p-thiomethylphenyl)-
 propionic acid,
beta-phenylethylidenylaminooxy-gamma-(m-methyl-
 phenyl)-butyric acid,
alpha-ethylidenylaminooxy-alpha-methyl-beta-(3-thienyl)-
 propionic acid, alpha-benzylidenylaminooxy-alpha-(3-thienyl)-acetic acid and
beta-phenylethylidenylaminooxy-gamma-(2-thienyl)-butyric acid.

The intermediates in this process are readily hydrolyzed to cleave the alkylidenyl group and form the desired aminooxy aralkanoic acids.

The aminooxy aralkanoic acids readily form acid addition salts with organic and inorganic acids such as hydrochloric acid, sulfuric acid, phosphoric acid, citric acid, maleic acid, tartaric acid, fumaric acid and glutamic acid.

These compounds are aminoacid decarboxylase inhibitors. In particular, they are 5-hydroxytryptophan decarboxylase, and DOPA decarboxylase, inhibitors. (DOPA is beta-(3,4-dihydroxyphenyl)-L-alanine.) They prevent the biosynthesis of norepinephrine and thereby produce a hypotensive effect in lowering of blood pressure, and a tranquilizing effect. The compounds are also indicated to be useful in the treatment of mental depression by mood elevation. Since the compounds are bases they can be used in the neutralization of acids and, in particular, they can be used in the isolation and purification of penicillin.

To achieve a therapeutic effect in an animal, one or more of the compounds can be administered as the free base, or in the form of a nontoxic acid addition salt, as a unit dosage form in sufficient amount to obtain the desired therapeutic effect. However, it is desirable in most instances to administer the compounds combined with a suitable pharmaceutical carrier or diluent to achieve a more convenient size to dosage relationship.

Pharmaceutical unit dosage forms can be readily produced by intimately mixing one or more of the compounds with a suitable pharmaceutical carrier. The carrier can be either a liquid or a solid. When a liquid is used either a solution or a suspension can be produced. Flavoring substances may be included as desired. Sterile water is the preferred liquid carrier; it readily dissolves the salts to form solutions.

Solid pharmaceutical carriers such as starch, sugar and talc can be used to form powders. Such powders can be tableted by the use of suitable lubricants such as magnesium stearate, binders such as gelatin and disintegrating agents like sodium bicarbonate in combination with citric or tartaric acid.

A typical hard gelatin capsule can have the composition:

| | Mg. |
|---|---|
| Alpha-aminooxy-beta-phenyl-propionic acid HCl | 100 |
| Lactose | 400 |
| Starch | 32 |
| Talc | 16 |

The preferred route of administering the aminooxy aralkanoic acids is oral and for this method tablets and capsules are ordinarily recommended. The unit-dosage compositions can contain from about 25 mg. to 1,000 mg., and advisably 50 to 200 mg., of the active compound with the dosage determined in view of the activity of the particular aminooxy aralkanoic acid used as well as the contemplated administrations per day. In general, daily administration of about 100 to 5,000 mg./day achieves the desired therapeutic effects.

The following examples are presented to illustrate the preparation of the compounds of this invention.

*Example 1.—Alpha-benzoylaminooxy-beta-phenylpropionic acid*

Benzohydroxamic acid (13.7 g., 0.10 mole), 20.8 g. (0.10 mole) of alpha-bromo-beta-phenylpropionic acid, and 8.0 g. (0.2 mole) of sodium hydroxide were refluxed together in 110 ml. of 10:1 ethanol-water for 20 hours. After reduction of the reaction volume to about 60 ml. by distillation, the solution was diluted to 400 ml. with water, acidified with excess acetic acid, and extracted twice with ethyl acetate. The organic layers were combined, dried over sodium sulfate, and stripped to give a brown oil. The residue crystallized under ether to provide 3.6 g. (13%) of product. M.P. 202–203° C.

*Anal.*—Calcd. for $C_{16}H_{15}NO_4$: N, 4.92. Found: N, 4.67.

*Example 2.—Alpha-aminooxy-beta-phenylpropionic acid hydrochloride*

The alpha-benzamido acid from Example 1 (3.0 g., 0.011 mole) and 30 ml. of 5 N hydrochloric acid were refluxed together for 4.5 hours. Cooling gave a solid which amounted to 1.4 g. of benzoic acid. The mother liquor was stripped and the residue recrystallized twice from ethyl acetate-n-hexane (Skelly-B) to provide 1.2 g. (52%) of product. M.P. 171–173° C.

*Analysis.*—Calcd. for $C_9H_{12}ClNO_3$; N.E., 108.9; Cl, 16.29. Found: N.E., 109.9; Cl, 17.21.

Various changes and modifications of the invention can be made and, to the extent that such variations incorporate the spirit of this invention, they are intended to be included within the scope of the appended claims.

What is claimed is:

1. A member of the group consisting of compounds of the formula

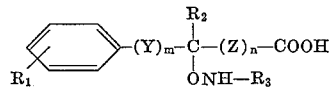

and nontoxic acid addition salts thereof, wherein $R_1$ is at least one substituent of the group consisting of hydrogen, halogen, hydroxy, lower alkyl, lower alkoxy, phenoxy, lower alkylenedioxy, nitro, amino and lower alkylthio, $R_2$ is a member of the group consisting of hydrogen and lower alkyl groups, $R_3$ is a member of the group consisting of hydrogen, lower alkanoyl, benzoyl, and phenyl-lower alkanoyl groups, Y and Z are lower alkylene and $m$ and $n$ are integers from 0 to 1.

2. A compound of the formula

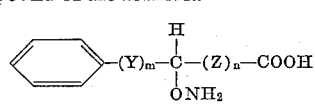

wherein Y and Z are lower alkylene and $m$ and $n$ are integers from 0 to 1.

3. A compound of the formula

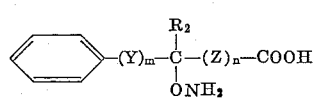

wherein $R_2$ is a lower alkyl, Y and Z are lower alkylene, and $m$ and $n$ are integers from 0 to 1.

4. Alpha-benzoylaminooxy-beta-phenylpropionic acid.
5. Alpha-aminooxy-beta-phenylpropionic acid.
6. Alpha-aminooxy-beta-phenylpropionic acid hydrochloride.

No references cited.

LORRAINE A. WEINBERGER, *Primary Examiner.*
DANIEL D. HORWITZ, *Examiner.*